(12) United States Patent
Demblewski

(10) Patent No.: US 8,719,941 B2
(45) Date of Patent: *May 6, 2014

(54) METHOD AND APPARATUS FOR PROVIDING MOBILE DEVICE MALWARE DEFENSE

(71) Applicant: AT&T Intellectual Property I, L.P., Atlanta, GA (US)

(72) Inventor: Michael Demblewski, Celebration, FL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/849,293

(22) Filed: Mar. 22, 2013

(65) Prior Publication Data

US 2013/0231085 A1    Sep. 5, 2013

Related U.S. Application Data

(63) Continuation of application No. 12/335,311, filed on Dec. 15, 2008, now Pat. No. 8,407,793.

(51) Int. Cl.
*G06F 11/00* (2006.01)

(52) U.S. Cl.
USPC ............... 726/24; 726/22; 726/23; 726/25; 713/188

(58) Field of Classification Search
USPC ................ 726/22, 23, 24, 25; 713/188
See application file for complete search history.

(56) References Cited

U.S. PATENT DOCUMENTS

| 8,220,054 | B1 * | 7/2012 | Lu | 726/24 |
| 8,407,793 | B2 * | 3/2013 | Demblewski | 726/24 |
| 2007/0233862 | A1 * | 10/2007 | Satish et al. | 709/225 |
| 2008/0086773 | A1 * | 4/2008 | Tuvell et al. | 726/23 |
| 2009/0305687 | A1 * | 12/2009 | Baldan | 455/419 |

\* cited by examiner

*Primary Examiner* — Edward Zee
*Assistant Examiner* — Baotran N To

(57) ABSTRACT

A method and apparatus for protecting a wireless communication network are disclosed. For example, the method identifies an infected mobile endpoint device via at least one audit by a mal-ware defense platform, and performs an anti-malware application update on the infected mobile endpoint device.

20 Claims, 3 Drawing Sheets

METHOD AND APPARATUS FOR PROVIDING MOBILE DEVICE MALWARE DEFENSE

This application is a continuation of U.S. patent application Ser. No. 12/335,311, filed on Dec. 15, 2008, now U.S. Pat. No. 8,407,793, and is herein incorporated by reference in its entirety.

The present invention relates generally to wireless communication network security and, more particularly, to a method and apparatus for providing mobile device malware defense, e.g., virus, worm, spyware, and Trojan horse protection, in wireless communication networks.

BACKGROUND OF THE INVENTION

The danger of a virus spreading from one mobile device to another mobile device is a growing risk that needs to be mitigated. Traditional antivirus software has focused on efforts protecting individual devices, such as personal computers (PC) and personal digital assistants (PDA), and these software products run locally on these devices and protect them against known viruses that are delivered via email or downloaded inadvertently by a user. Traditional antivirus systems for email server applications supporting mobile devices may employ a gateway that scans incoming and outgoing email messages. This type of gateway solution causes unnecessary delay in email message delivery.

SUMMARY OF THE INVENTION

In one embodiment, the present invention discloses a method and apparatus for protecting a wireless communication network. For example, the method identifies an infected mobile endpoint device via at least one audit by a mal-ware defense platform, and performs an anti-malware application update on the infected mobile endpoint device.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The danger of a virus spreading from one mobile device to another mobile device is a growing risk that needs to be mitigated. Traditional antivirus software has focused on efforts protecting individual devices, such as personal computers (PC) and personal digital assistants (PDA), and these software products run locally on these devices and protect them against known viruses that are delivered via email or downloaded inadvertently by a user. Traditional antivirus systems for email server applications supporting mobile devices may employ a gateway that scans incoming and outgoing email messages. This type of gateway solution causes unnecessary delay in email message delivery. Moreover, future vulnerabilities and malware attacks will exploit the weaknesses in the Short Message Service (SMS), Instant Messaging (IM) and Multimedia Messaging Service (MMS) application delivery platforms that existing email antivirus gateway solutions are not designed to protect against attacks through these services.

Figure 1:
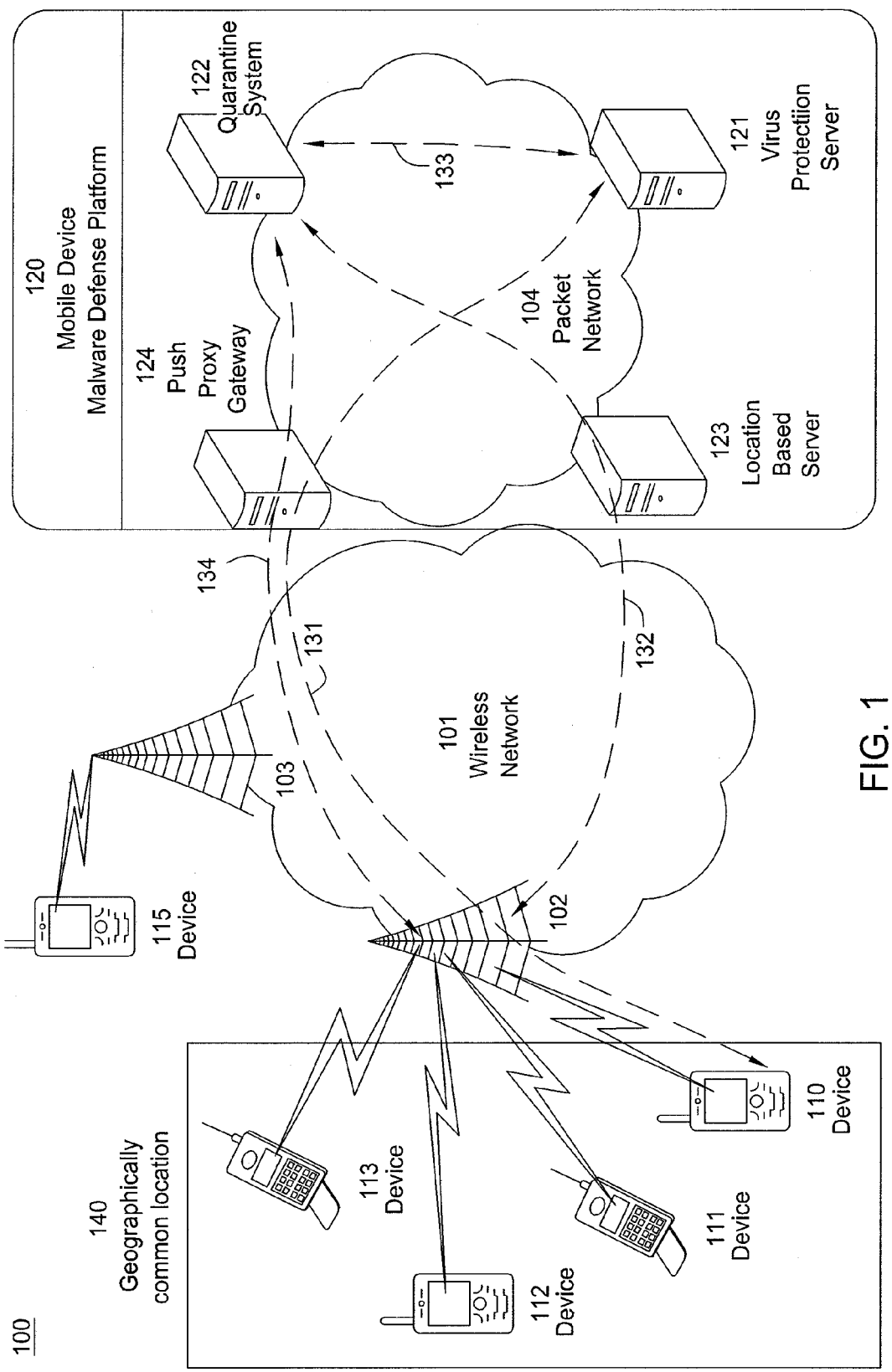
FIG. 1 illustrates an illustrative mobile device malware defense system in a wireless network related to the present invention.

To address this criticality, embodiments of the present invention enable a Mobile Device Malware Defense (MDMD) platform to protect mobile devices from malicious attacks, e.g., virus, worm, spyware, and Trojan horse, in wireless communication networks. FIG. 1 illustrates an illustrative mobile device malware defense system 100 in a wireless network related to the present invention. Note that malware stands for malicious software. In FIG. 1, five mobile endpoint devices, 110, 111, 112, 113, and 115, (e.g., PDAs, smart phones, or mobile phones, and the like) are served by a wireless network 101. In one illustrative example, mobile endpoint devices 110, 111, 112, and 113 are located and operating in a geographically common location 140 served by the same cell site, 102. Mobile endpoint device 115 served by a different cell site, 103, is located in a geographically different location from the other four mobile endpoint devices. Even though cell sites 102 and 103 are part of a 2G, 3G or 4G cellular network and the like, they are interchangeable to be access points (AP) as part of a WiFi or WiMAX network or ALL-IP network (4G).

Broadly defined, Wi-Fi is a wireless local area network (WLAN) technology, e.g., based on the Institute of Electrical & Electronics Engineers (IEEE) 802.11 standards. WiMAX is a wireless metropolitan area network (MAN) technology, e.g., based on the Institute of Electrical & Electronics Engineers (IEEE) 802.16 standards. 2G is the second generation cellular network technology while 3G is the third generation cellular network technology, and 4G is the fourth generation cellular network technology.

In one embodiment, a mobile device malware defense (MDMD) platform 120 is connected to the wireless network 101 and can communicate with the mobile endpoint devices via the wireless network 101. In one embodiment, the mobile device malware defense platform 120 comprises of four components including a Virus Protection Server (VPS) 121, a Quarantine System (QS) 122, a Location Based Server (LBS) 123, and a Push Proxy Gateway (PPG) 124.

In one embodiment, the VPS 121 is responsible for providing malware protection functions to the mobile endpoint devices including auditing the mobile endpoint devices to obtain and store the individual fingerprints of these audited mobile endpoint devices. For example, a fingerprint of a mobile endpoint device is a snapshot of all processes currently running on the mobile endpoint devices. By analyzing the audited fingerprints regularly, the VPS 121 can identify security threats on a mobile endpoint device and trigger the appropriate responding actions to contain such threats including installing antivirus applications and/or updating virus definition files (broadly referred to as anti-malware applications and/or files) on the infected mobile endpoint devices. In one embodiment, the VPS 121 also pushes antivirus applications and virus definition updates to other mobile endpoint devices in the vicinity (broadly defined as a geographical area or common location supported by a particular cell site) of the infected mobile device to help contain the security threat posed by the infected mobile device. It should be noted that although the above description discusses the use of anti-virus applications, the present invention is not so limited. In other words, the mobile endpoint device may be infected with codes (broadly referred to as mal-ware) that negatively impact the mobile endpoint device in some fashion that may not be considered to be infected with a virus. As such, the above discussion pertaining to installing or updating anti-virus applications and/or files should be broadly interpreted as installing or updating anti-malware applications and/or files.

As discussed above, a fingerprint of a mobile endpoint device is a snapshot of all processes currently running on the mobile endpoint devices. To illustrate, a mobile endpoint device may be operating with four distinct applications. When the mobile endpoint device is audited, these four distinct applications will be noted as a fingerprint for the mobile endpoint device. Over time, a collection of these fingerprints will be stored for each mobile endpoint device. In one embodiment of the present invention, when the number of processes as captured in these fingerprints is changed, the present invention detects such change and one or more steps are taken to determine whether the mobile endpoint device has been infected. For example, if a mobile endpoint device typically operates with four processes, but a recent audit reveals that the mobile endpoint device is now operating with ten processes, then the present invention is alerted to this change.

In one alternate embodiment, the present invention may employ statistical analysis on the stored fingerprints. For example, the present invention may track a plurality of fingerprints for a plurality of customers over a period of time. The results of the statistical analysis can be used to determine whether remedial steps should be taken in response to a detection that the number of processes has changed for a particular mobile endpoint device. For example, the statistical analysis may reveal that a new service or feature may be deployed every six months, where the new service or feature may require a new process to be deployed in the mobile endpoint device. Under this illustrative example, detecting an increase of a single process in a mobile endpoint device may not trigger an alarm or an inquiry, whereas an increase of five processes will trigger an alarm or an inquiry.

In one embodiment, the QS 122 is responsible for quarantining infected mobile endpoint devices once identified. For example, QS 122 sends alert messages to other mobile endpoint devices located in the vicinity of an infected mobile endpoint device to warn these nearby mobiles endpoint devices about the potential security threat. In one embodiment, the QS 122 interfaces with LBS 123 to obtain the current location of an infected mobile device. QS 122 may also instruct VPS 121 to audit and inoculate the infected mobile endpoint device and other mobile endpoint devices in the vicinity of the infected mobile endpoint device on demand.

In one embodiment, the LBS 123 is responsible for identifying the current physical location, such as cell site address location or Global Positioning System (GPS) location information, of a mobile endpoint device.

In one embodiment, the PPG 124 is responsible for performing push operations for content delivery between VPS 121 and mobile endpoint devices. It is also responsible for forwarding quarantine related alert messages between QS 122 and mobile endpoint devices. In one embodiment of the present invention, the PPG 124 uses the WAP protocol to perform push operations to issue commands and deliver anti-virus related applications and contents to mobile endpoint devices.

In one embodiment, the VPS 121, QS 122, LBS 123, PPG 124 are interconnected via packet network 104. It should be noted that the number of deployed VPS 121, QS 122, LBS 123, PPG 124 can be tailored to meet the requirement of a particular implementation. Furthermore, although the present disclosure describes a Mobile Device Malware Defense (MDMD) platform having four modules, the present invention is not so limited. The Mobile Device Malware Defense (MDMD) platform can be implemented using any number of modules performing the various functions as disclosed in the present disclosure.

To illustrate exemplary capabilities of the Mobile Device Malware Defense (MDMD) platform 120, the following scenarios are used to describe various interactions between the MDMD platform components and the mobile endpoint devices. For example, mobile endpoint device 110 may have been infected by a mobile device virus. VPS 121 has been auditing mobile endpoint devices, including mobile endpoint device 110, to obtain fingerprints for security analysis purposes. VPS 121 sends an audit command to PPG 124 and PPG 124 in turn pushes the audit command using WAP protocol to mobile endpoint device 110. Once the audit command has been executed by mobile endpoint device 110, the fingerprint of mobile endpoint device 110 is then returned to the VPS 121 via the PPG 124. This interaction is shown as flow 131 in FIG. 1. VPS 121 subsequently detects that in the latest audit fingerprint that one of the processes running on mobile endpoint device 110 is a security threat. Using the received fingerprint from mobile endpoint device 110, VPS 121 can determine if the mobile endpoint device has antivirus software installed or the installed virus definition file is up-to-date. If no antivirus software is installed, VPS 121 can initiate the download of an antivirus application with the latest virus definition file to mobile endpoint device 110 using flow 131. If antivirus software has been installed but the virus definition file is outdated, VPS 121 can initiate the download of the latest virus definition file to mobile endpoint device 110 using flow 131. In addition, VPS 121 can upload suspected infected files residing on mobile endpoint device 110 for further analysis. Optionally, VPS 121 can issue a command to halt the suspected security threat process currently running on or delete the suspected infected files from mobile endpoint device 110 using flow 131.

Once the mobile endpoint device 110 has been identified as a security threat, VPS 110 will inform QS 122 about the threat using flow 133. QS 122 subsequently issues a location query command to LBS 123 to inquire about the current location of mobile endpoint device 110. LBS 123 uses wireless network 101 to obtain the location information, e.g., cell site address or GPS coordinates information, and returns the location information back to the QS 122. This interaction is shown in flow 132. In this illustrative example, mobile endpoint device 110 is being served by cell site 102. With the current location of mobile endpoint device 110 having been identified, QS 122 may broadcast alert messages to various mobile devices (e.g., mobile devices 111, 112, and 113) via cell site 102 in the form of SMS text messages using flow 134. Security threat posed by mobile device 110 can potentially spread to other nearby mobile endpoint devices using wireless network 101 or Bluetooth connectivity. Having been informed, these mobile devices 111, 112, and 113 may avoid interacting with the infected mobile endpoint device.

Furthermore, QS 122 may inform VPS 121 about the current location of mobile endpoint device 110 and instruct VPS 121 to initiate audit commands to all mobile endpoint devices in the vicinity of mobile endpoint device 110. Hence, VPS 121 effectively quarantines the infected mobile endpoint device by inoculating all other mobile endpoint devices, such as mobile endpoint devices 111, 112, and 113, in its vicinity to contain or eliminate the security threat posed by the infected mobile endpoint device 110 in the geographically common location 140.

Note that mobile endpoint device 115 served by cell site 103 is not in the vicinity of mobile endpoint device 110; therefore, no malware defense response or action is required. In other words, the level of inoculation can be carefully implemented based upon the detected level of infection, e.g., from region to region.

Figure 2:
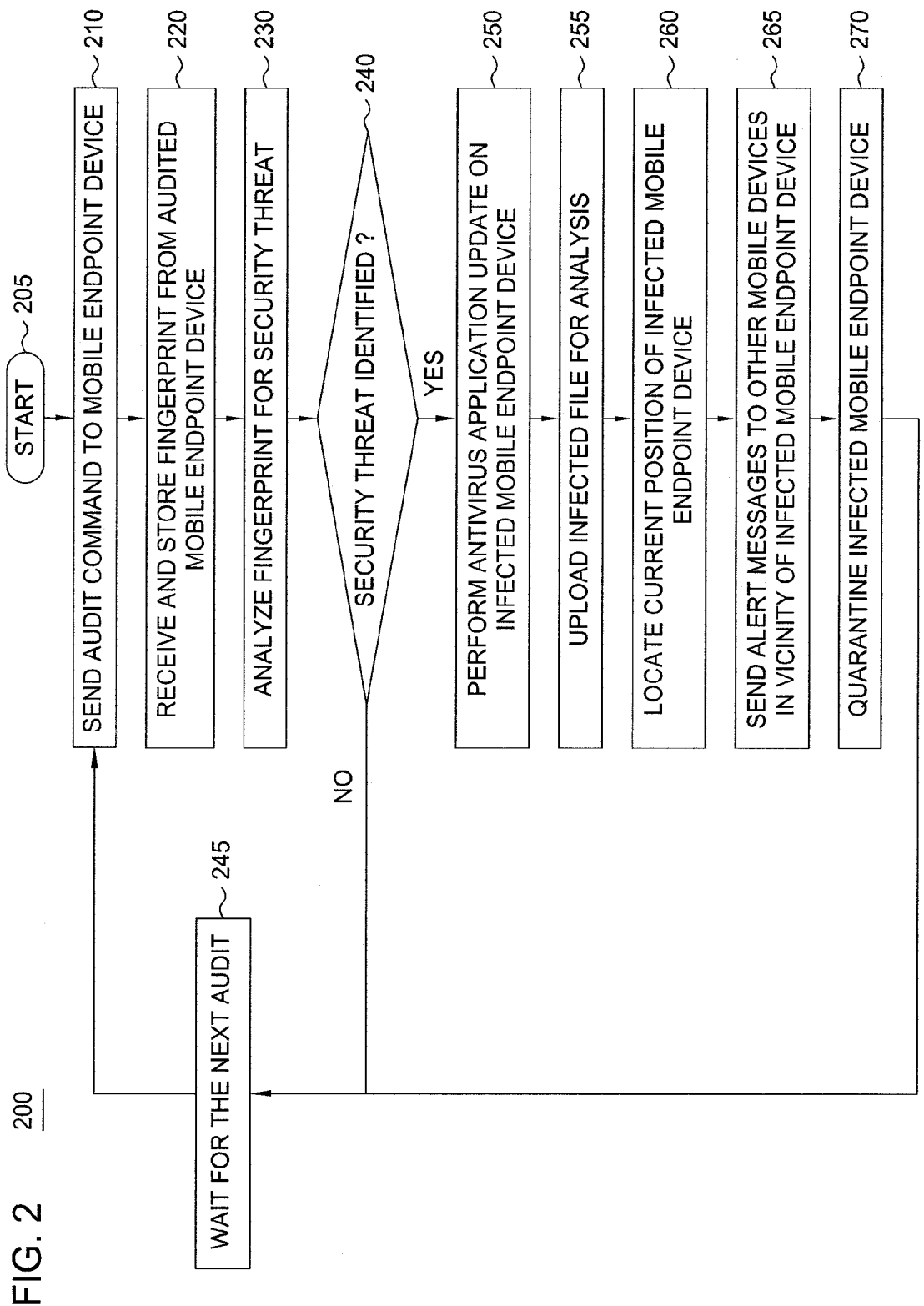
FIG. 2 illustrates a flowchart of a method for providing mobile device malware defense in a wireless communication network of the present invention.

FIG. 2 illustrates a flowchart of a method 200 for providing mobile endpoint device malware defense in a wireless communication network of the present invention. For example, one or more steps of method 200 can be implemented in a Mobile Device Malware Defense (MDMD) platform.

Method 200 starts in step 205 and proceeds to step 210. In step 210, the method sends an audit command to a mobile endpoint device. For example, the command is originated by a VPS and is pushed to the mobile endpoint device via a PPG. Once the audit command is received by the mobile endpoint device, the mobile endpoint device creates a fingerprint and returns the audit fingerprint to the VPS via a PPG. A fingerprint of the mobile endpoint device is a snapshot of all processes running on the mobile endpoint device.

In step 220, the method receives an audit fingerprint back from the audited mobile endpoint device. The method also stores the received fingerprint for future reference and further processing. The fingerprint is received and stored by the VPS.

In step 230, the method analyzes the received audit fingerprint to determine if a security threat exists in the mobile device. The fingerprint is analyzed by the VPS.

In step 240, the method checks if a security threat has been identified. If a security threat has been identified, the method proceeds to step 250; otherwise, the method proceeds to step 245. For example, the security threat can be detected and identified by the VPS.

In step 245, the method waits for a period of time before the next audit operation will be triggered and then proceeds back to step 210.

In step 250, the method performs an antivirus application update on the infected mobile endpoint device. For example, if the mobile device has no installed antivirus application, the method installs a copy of an antivirus application with the latest virus definition file onto the infected mobile endpoint device. If the mobile endpoint device has an installed antivirus application but the virus definition file is outdated, then the method installs the latest virus definition file on the infected mobile endpoint device. For example, this update is performed on the mobile endpoint device by the VPS via a PPG. In one embodiment, the newly installed or newly updated antivirus application can optionally issue a command to halt or purge the suspected process currently running on the infected mobile endpoint device, or simply delete or purge the associated infected files from the infected mobile endpoint device.

In step 255, the method uploads the suspected infected file for further analysis. For example, the uploads are performed by the VPS via a PPG.

In step 260, the method obtains the current location of the infected mobile endpoint device. For example, the location information can be the cell site address of the cell site serving the infected mobile endpoint device or the GPS information of the infected mobile endpoint device. For example, the location query is initiated by the QS and executed by a LBS. In one embodiment, the original identity of the infected mobile endpoint device can be sent by the VPS to the QS. Once the current location of the infected mobile endpoint device is obtained by the LBS, the LBS forwards the location information to the QS for further processing.

In step 265, the method broadcasts alert messages to, e.g., all other mobile endpoint devices located in the vicinity of the infected mobile endpoint device. In one embodiment of the present invention, the broadcasts are made by the QS via a PPG using Short Message Service (SMS) text messages to warn nearby mobile endpoint devices of the security threat posed by the infected mobile device. Alternatively, the nearby mobile endpoint devices having been warned of the infected mobile endpoint device may optionally avoid interaction with the infected mobile endpoint device, e.g., temporarily refusing to interact with the infected mobile endpoint device (e.g., refusing to answer a call or to accept a file transfer).

In step 270, the method performs quarantine actions to neutralize the security threat posed by the infected mobile endpoint device. For example, the method may send audit commands to all other mobile endpoint devices in the vicinity of the infected mobile endpoint device and performs antivirus application and related file updates on these nearby mobile endpoint devices. For example, the audit command is sent and the antivirus application update is instructed by the QS to be performed by the VPS. Once the nearby mobile endpoint devices have been inoculated with the update (e.g., updated with the proper software update to handle the detected virus software or mal-ware), subsequent interactions with the infected mobile endpoint device will not proliferate the infection throughout the network. Alternatively, the nearby mobile endpoint devices having been warned of the infected mobile endpoint device may simply avoid interaction with the infected mobile endpoint device, e.g., temporarily refusing to interact with the infected mobile endpoint device (e.g., refusing to answer a call or to accept a file transfer) via a blacklist. It should be noted that the level of quarantine that is implemented can be premised on the perceived severity of the security threat. For example, a virus that proliferates a harmless advertisement to other mobile endpoint devices may be treated differently, (e.g., sending a warning message to other mobile endpoint devices to ignore the message) than a virus that obtains personal information of a user stored on a mobile endpoint device (e.g., purging the suspected process immediately from the infected mobile endpoint device and uploading any suspected files for further analysis). The method then proceeds to step 245.

It should be noted that although method 200 discloses a plurality of steps that can be performed, one or more steps of method 200 can be deemed to be optional. Namely, one or more steps of method can be omitted to meet the requirements of a particular implementation.

It should be noted that although not specifically specified, one or more steps of method 200 may include a storing, displaying and/or outputting step as required for a particular application. In other words, any data, records, fields, and/or intermediate results discussed in the method 200 can be stored, displayed and/or outputted to another device as required for a particular application. Furthermore, steps or blocks in FIG. 2 that recite a determining operation, or involve a decision, do not necessarily require that both branches of the determining operation be practiced. In other words, one of the branches of the determining operation can be deemed as an optional step.

Figure 3:
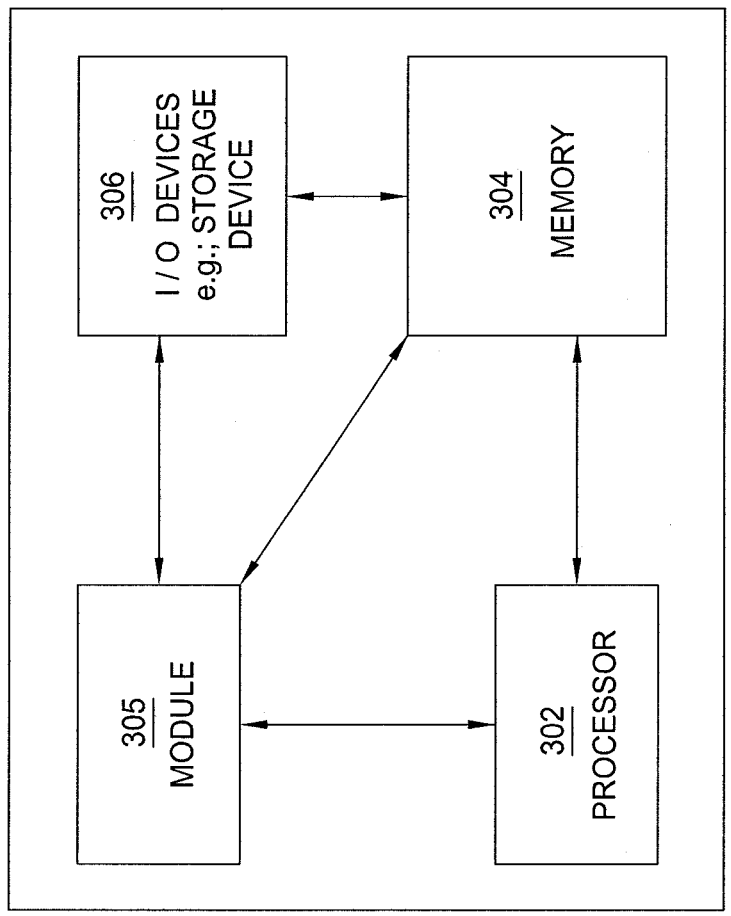
FIG. 3 illustrates a high level block diagram of a general purpose computer suitable for use in performing the functions described herein.

FIG. 3 depicts a high level block diagram of a general purpose computer suitable for use in performing the functions described herein. As depicted in FIG. 3, the system 300 comprises a processor element 302 (e.g., a CPU), a memory 304, e.g., random access memory (RAM) and/or read only memory (ROM), a module 305 for providing a mobile device malware defense, and various input/output devices 306 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 305 for providing a mobile device malware defense can be loaded into memory 304 and executed by processor 302 to implement the functions as discussed above. As such, the present process 305 for providing a mobile device malware defense (including associated data structures) of the present invention can be stored on a computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for protecting a wireless communication network, comprising:
    performing, by a processor, a first audit of a mobile endpoint device, wherein the first audit obtains a first fingerprint that comprises a first snapshot of processes running on the mobile endpoint device;
    performing, by the processor, a second audit of the mobile endpoint device, wherein the second audit obtains a second fingerprint that comprises a second snapshot of processes running on the mobile endpoint device;
    analyzing, by the processor, the first audit and the second audit to identify the mobile endpoint device as an infected mobile endpoint device when a number of processes running on the mobile endpoint device in the second fingerprint has changed from a number of processes running on the mobile endpoint device in the first fingerprint; and
    performing, by the processor, an anti-malware application update on the infected mobile endpoint device.

2. The method of claim 1, wherein the wireless communication network comprises a cellular network.

3. The method of claim 1, wherein the analyzing comprises:
    performing an analysis on the first audit and the second audit to identify a security threat residing on the infected mobile endpoint device.

4. The method of claim 3, wherein the first audit, the second audit and the analyzing are performed by the processor of a virus protection server via a push proxy gateway.

5. The method of claim 1, wherein the performing the anti-malware application update comprises:
    installing an anti-malware application on the infected mobile endpoint device.

6. The method of claim 5, wherein the performing the anti-malware application update further comprises:
    uploading a suspected file from the infected mobile endpoint device for further analysis; and
    purging the suspected file from the infected mobile endpoint device.

7. The method of claim 6, wherein the installing, uploading, and purging are performed by the processor of a virus protection server via a push proxy gateway.

8. The method of claim 1, further comprising:
    quarantining the infected mobile endpoint device to isolate the infected mobile endpoint device from other mobile endpoint devices coupled to the wireless communication network.

9. The method of claim 8, wherein the quarantining further comprises:
    determining a current physical location of the infected mobile endpoint device, wherein the current physical location is used to identify a cell site.

10. The method of claim 9, wherein the current physical location comprises a cell site address.

11. The method of claim 8, wherein the quarantining comprises:
    sending audit commands to the other mobile endpoint devices in a vicinity of the infected mobile endpoint device; and
    installing an antivirus application on the other mobile endpoint devices.

12. The method of claim 8, wherein the quarantining comprises:
    alerting the other mobile endpoint devices in a vicinity of the infected mobile endpoint device with messages for warning the other mobile endpoint devices of a security threat posed by the infected mobile endpoint device.

13. The method of claim 1, wherein the performing the anti-malware application update comprises:
    updating an existing anti-malware application on the infected mobile endpoint device.

14. A non-transitory computer-readable medium storing a plurality of instructions which, when executed by a processor, cause the processor to perform operations for protecting a wireless communication network, the operations comprising:
    performing a first audit of a mobile endpoint device, wherein the first audit obtains a first fingerprint that comprises a first snapshot of processes running on the mobile endpoint device;
    performing a second audit of the mobile endpoint device, wherein the second audit obtains a second fingerprint that comprises a second snapshot of processes running on the mobile endpoint device;
    analyzing the first audit and the second audit to identify the mobile endpoint device as an infected mobile endpoint device when a number of processes running on the mobile endpoint device in the second fingerprint has changed from a number of processes running on the mobile endpoint device in the first fingerprint; and
    performing an anti-malware application update on the infected mobile endpoint device.

15. The non-transitory computer-readable medium of claim 14, wherein the analyzing comprises:
    performing an analysis on the first audit and the second audit to identify a security threat residing on the infected mobile endpoint device.

16. The non-transitory computer-readable medium of claim 14, wherein the performing the anti-malware application update comprises:
    installing an anti-malware application on the infected mobile endpoint device.

17. The non-transitory computer-readable medium of claim 16, wherein the performing the anti-malware application update further comprises:
    uploading a suspected file from the infected mobile endpoint device for further analysis; and purging the suspected file from the infected mobile endpoint device.

18. The non-transitory computer-readable medium of claim 14, further comprising:

quarantining the infected mobile endpoint device to isolate the infected mobile endpoint device from other mobile endpoint devices coupled to the wireless communication network.

19. The non-transitory computer-readable medium of claim 18, wherein the quarantining further comprises:

determining a current physical location of the infected mobile endpoint device, wherein the current physical location is used to identify a cell site.

20. A system for protecting a wireless communication network, comprising:

a processor; and a computer-readable medium storing a plurality of instructions which, when executed by the processor, cause the processor to perform operations, the operations comprising:

performing a first audit of a mobile endpoint device, wherein the first audit obtains a first fingerprint that comprises a first snapshot of processes running on the mobile endpoint device;

performing a second audit of the mobile endpoint device, wherein the second audit obtains a second fingerprint that comprises a second snapshot of processes running on the mobile endpoint device;

analyzing the first audit and the second audit to identify the mobile endpoint device as an infected mobile endpoint device when a number of processes running on the mobile endpoint device in the second fingerprint has changed from a number of processes running on the mobile endpoint device in the first fingerprint; and performing an anti-malware application update on the infected mobile endpoint device.

* * * * *